(12) United States Patent
Chen et al.

(10) Patent No.: US 11,541,641 B2
(45) Date of Patent: Jan. 3, 2023

(54) SURFACE COVERING HAVING AN ACOUSTICAL COMPONENT

(71) Applicant: Novalis Holdings Limited, Wanchai (HK)

(72) Inventors: Hao Allen Chen, Ashburn, VA (US); Chee-Shong Wu, Toronto (CA)

(73) Assignee: Novalis Holdings Limited, Wanchai (HK)

( * ) Notice: Subject to any disclaimer, the term of this patent is extended or adjusted under 35 U.S.C. 154(b) by 91 days.

(21) Appl. No.: 15/799,294

(22) Filed: Oct. 31, 2017

(65) Prior Publication Data

US 2019/0126595 A1 May 2, 2019

(51) Int. Cl.
| | |
|---|---|
| *B32B 27/06* | (2006.01) |
| *B32B 9/02* | (2006.01) |
| *B32B 5/18* | (2006.01) |
| *B32B 27/08* | (2006.01) |
| *B32B 27/30* | (2006.01) |
| *B32B 27/40* | (2006.01) |
| *B32B 27/32* | (2006.01) |
| *B32B 7/12* | (2006.01) |

(52) U.S. Cl.
CPC .............. *B32B 27/065* (2013.01); *B32B 5/18* (2013.01); *B32B 7/12* (2013.01); *B32B 9/02* (2013.01); *B32B 27/08* (2013.01); *B32B 27/302* (2013.01); *B32B 27/304* (2013.01); *B32B 27/306* (2013.01); *B32B 27/32* (2013.01); *B32B 27/40* (2013.01); *B32B 2255/26* (2013.01); *B32B 2266/025* (2013.01); *B32B 2266/0221* (2013.01); *B32B 2266/0228* (2013.01); *B32B 2266/0235* (2013.01); *B32B 2266/0278* (2013.01); *B32B 2305/022* (2013.01); *B32B 2307/102* (2013.01)

(58) Field of Classification Search
CPC .................................................. B32B 2255/26
See application file for complete search history.

(56) References Cited

U.S. PATENT DOCUMENTS

| | | | | |
|---|---|---|---|---|
| 4,908,408 | A | * | 3/1990 | Boutillier ........... C08G 18/6204 525/124 |
| 6,576,577 | B1 | * | 6/2003 | Garner ..................... B32B 5/18 428/304.4 |
| 7,181,891 | B2 | | 2/2007 | Surace et al. |
| 3,066,097 | A1 | | 11/2011 | Boyadjian et al. |
| 8,640,824 | B2 | | 2/2014 | Freedman et al. |
| 2002/0168501 | A1 | * | 11/2002 | Sigel ..................... B05D 5/061 428/195.1 |

(Continued)

FOREIGN PATENT DOCUMENTS

| | | |
|---|---|---|
| CN | 1894474 A | 1/2007 |
| CN | 205637482 U | 10/2016 |
| EP | 3281783 A1 | 2/2018 |

OTHER PUBLICATIONS

Notification, and the International Search Report and the Written Opinion of the International Searching Authority, or the Declaration, PCT/CN2018/111541, dated Jan. 23, 2019, 10 pages.

(Continued)

*Primary Examiner* — Ian A Rummel
(74) *Attorney, Agent, or Firm* — Barley Snyder

(57) ABSTRACT

A surface covering is provided and includes an upper section of laminated polymeric layers and an acoustical section for dissipating sound waves.

24 Claims, 5 Drawing Sheets

(56) References Cited

U.S. PATENT DOCUMENTS

| | | | | |
|---|---|---|---|---|
| 2012/0096792 | A1* | 4/2012 | Thiers | E04F 15/181 |
| | | | | 52/309.4 |
| 2013/0299273 | A1* | 11/2013 | Freedman | E04F 15/105 |
| | | | | 181/290 |
| 2014/0044936 | A1* | 2/2014 | Wilson | B32B 27/20 |
| | | | | 428/201 |
| 2014/0099487 | A1* | 4/2014 | Algrisi | C09J 11/08 |
| | | | | 428/201 |
| 2014/0302294 | A1* | 10/2014 | Freedman | E04F 15/105 |
| | | | | 428/213 |
| 2014/0315021 | A1* | 10/2014 | Naert | C09D 127/06 |
| | | | | 428/394 |

OTHER PUBLICATIONS

Abstract of CN 205637482U, dated Oct. 12, 2016, 1 page.
European Search Report, App. No. 18872045.2-1107 / 3704322
PCT/CN2018111541, dated Jul. 26, 2021, 8 pages.

* cited by examiner

SURFACE COVERING HAVING AN ACOUSTICAL COMPONENT

FIELD OF THE INVENTION

The invention generally relates to a surface covering and, more specifically, to a surface covering having enhanced performance and acoustical properties.

BACKGROUND

Unwanted and uncontrolled noises can be disturbing, distressful, or even hazardous in many environments. Such noises are typically produced by impact between two rigid materials causing structures within the materials to undergo rapid short-range bending and stretching of interatomic bonds and rapid elastic response, thus producing high-frequency sound waves in the adjacent air or transmitting sound through adjacent floor, ceiling, or wall assemblies.

High noise levels and reverberations are common issues in many household, hospital, hotel, and work settings. Long term exposure to such noise can cause fatigue, stress, poor sleep quality, and hearing loss as well as many other negative side effects to human health. Poor acoustical controls create problems ranging from noise transmission through floor and ceiling assemblies, and through party walls between neighboring units of buildings such as condominiums, townhouses, apartments and other multi-family dwellings, hotels, hospitals, schools, and offices.

Freedom from intrusive noise in living and working quarters becomes a significant issue for homeowners, hotel guests, hospital patients, students, workers, and other tenants. In many countries, building codes and standards define appropriate levels of acoustical performance in building materials. Such codes have now become law in many locales. Architects and designers require floor, wall, and ceiling assemblies to meet a minimum standard in order to satisfy the building codes for acoustical properties. For instance, certain building codes require floor/ceiling assemblies to meet a minimum standard of 50 in STC (sound transmission class) and 50 in IIC (impact isolation class) according to ASTM E90 and ASTM E492 respectively.

Materials to control the transmission and reverberation of sound are known. However, tiles made from these materials can be cumbersome, expensive to transport and store, and additionally not address acoustical concerns.

U.S. Pat. No. 8,640,824 (Freedman et al.) discloses an acoustical tile having an integrated acoustical layer that uses crumb rubber as the primary acoustical component. However, the disclosed material produces an unpleasant odor due to its sulfur content.

Thus, there is a need for a surface covering having an acoustical component that reduces the transmission and reverberation of sound in living and working quarters.

SUMMARY

Accordingly, the present invention was devised in light of the problems described above, to provide a surface covering in a modular format for a resilient surface covering having an acoustical component. More particularly, the surface covering includes an upper section of laminated polymeric layers and an acoustical section for dissipating sound waves.

BRIEF DESCRIPTION OF THE DRAWINGS

The invention will be explained in greater detail in the following with reference to embodiments, referring to the appended drawings, in which.

DETAILED DESCRIPTION OF THE EMBODIMENT(S)

Figure 1:
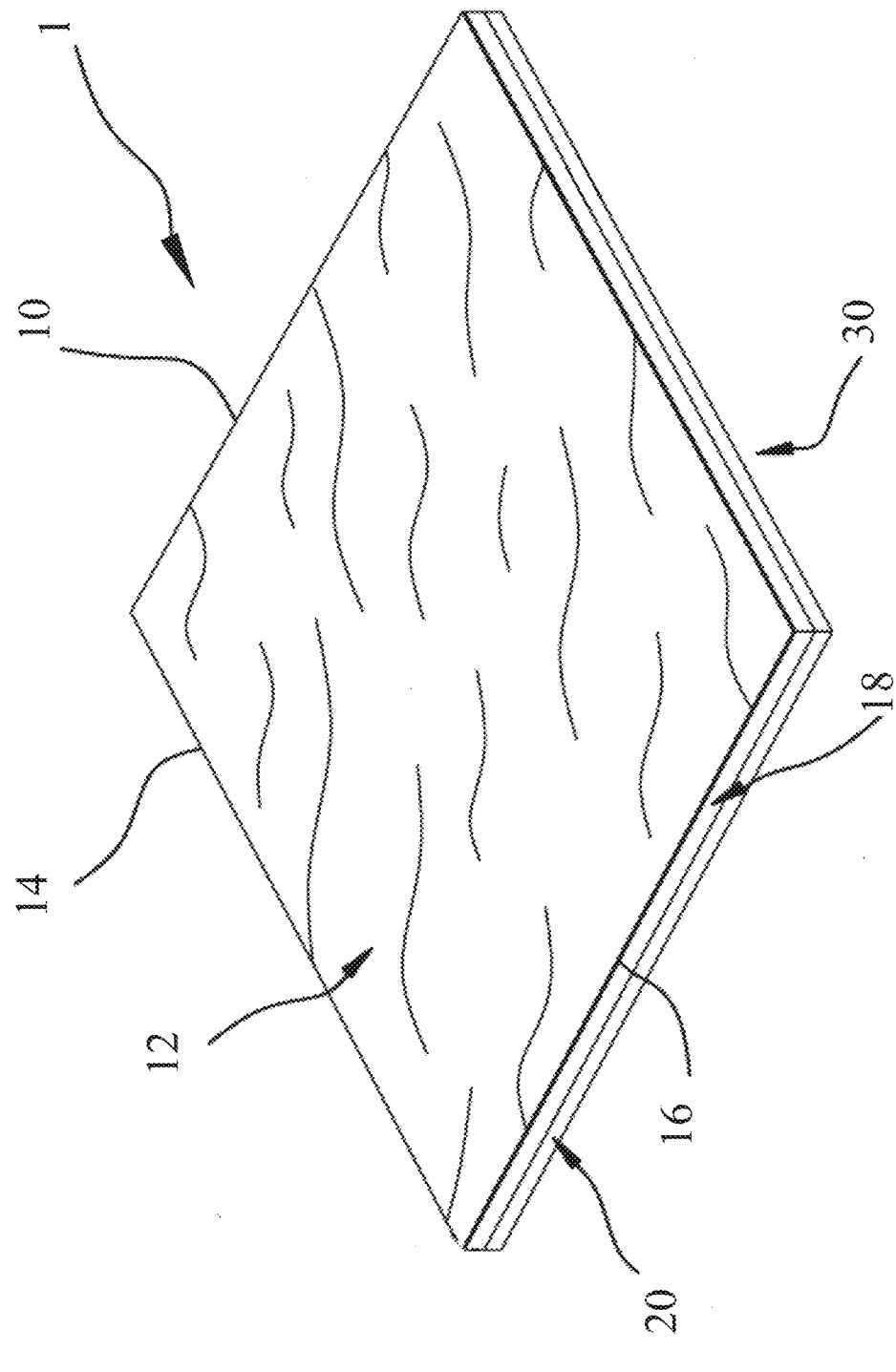
FIG. 1 is a perspective view of an embodiment of an exemplary surface covering according to the invention.
Figure 2:
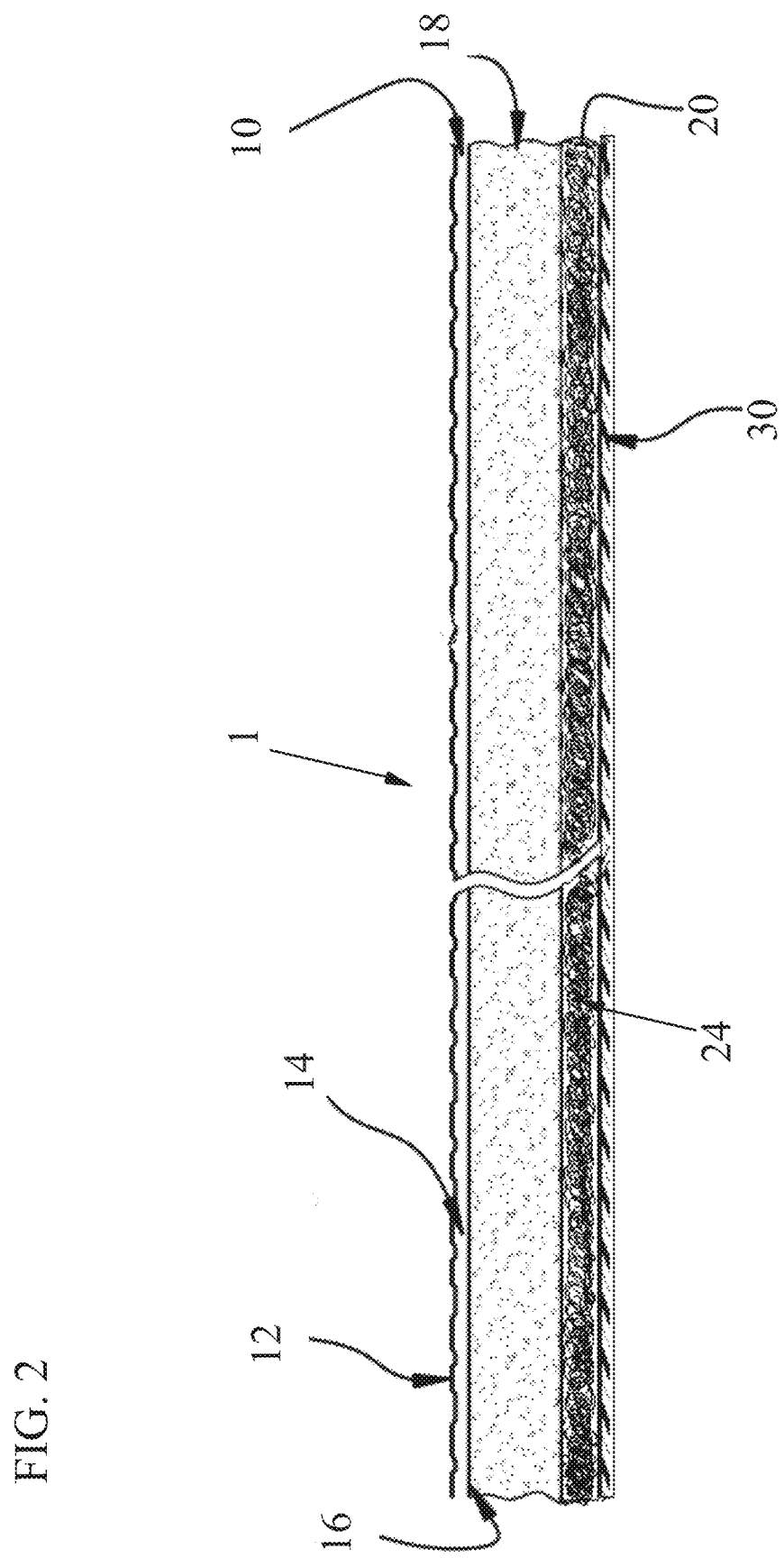
FIG. 2 is a sectional view of the surface covering of FIG. 1.
Figure 3:
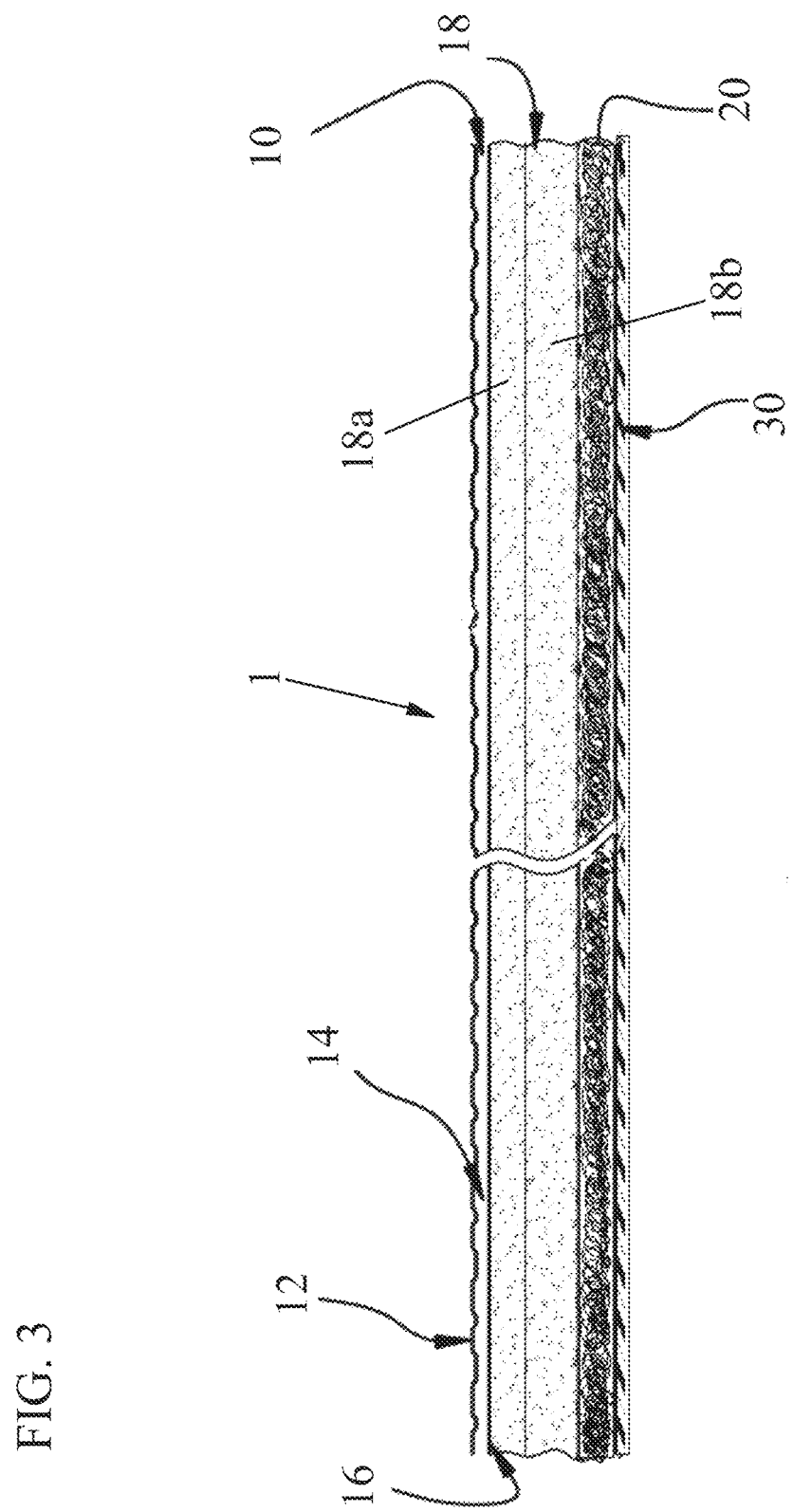
FIG. 3 is a sectional view of another embodiment of an exemplary surface covering according to the invention.
Figure 4:
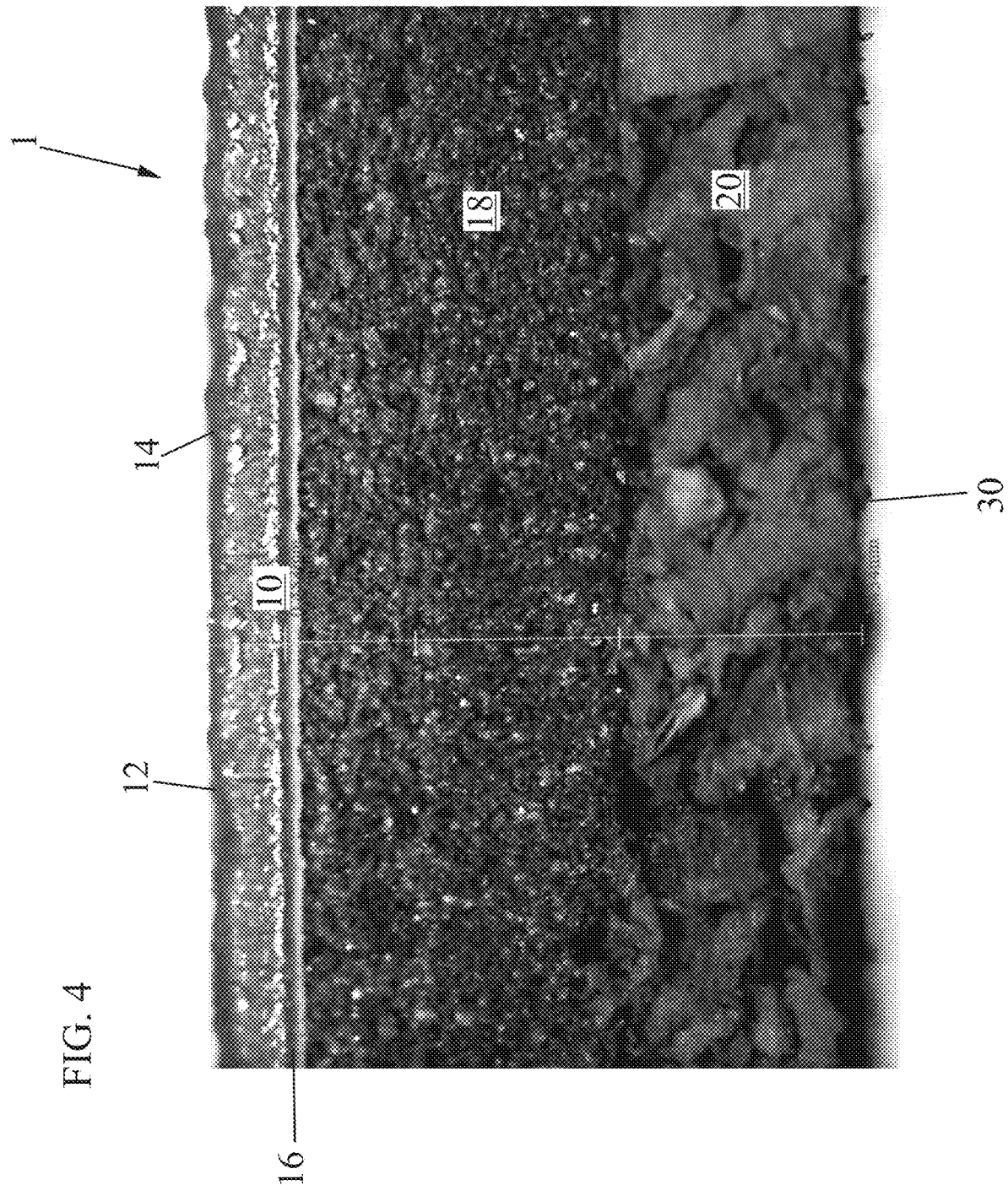
FIG. 4 is a photomicrograph of a surface covering according to the invention.
Figure 5:
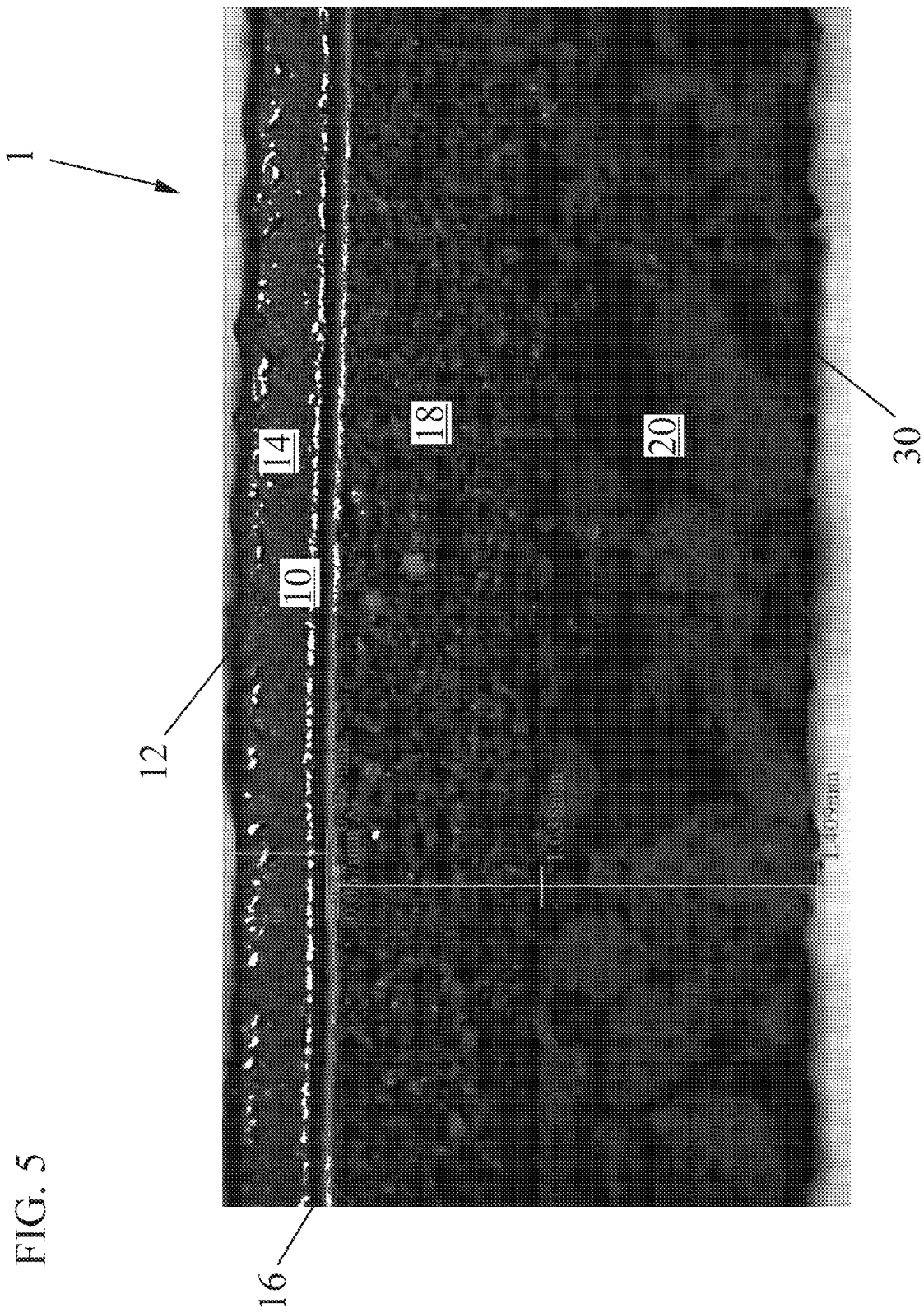
FIG. 5 is a photomicrograph of another surface covering according to the invention.

The following text sets forth a broad description of various exemplary embodiments of the invention. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

Unless defined otherwise, all technical and scientific terms used herein have the same meaning as commonly understood by one of ordinary skill in the art to which this invention belongs. In case of conflict, the present application including the definitions will control. Also, unless otherwise required by context, singular terms shall include pluralities and plural terms shall include the singular. All publications, patents, and other references mentioned herein are incorporated by reference in their entireties for all purposes.

Unless otherwise specified, when the following abbreviations are used herein, they have the following meaning:

As used herein, the terms "comprises," "comprising," "includes," "including," "has," "having," "contains," or "containing," or any other variation thereof, will be understood to imply the inclusion of a stated integer or group of integers but not the exclusion of any other integer or group of integers. For example, a composition, a mixture, a process, a method, an article, or an apparatus that comprises a list of elements is not necessarily limited to only those elements but can include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances, that is, occurrences of the element or component. Therefore "a" or "an" should be read to include one or at least one, and the singular word form of the element or component also includes the plural unless the number is obviously meant to be singular.

The term "invention" or "present invention" as used herein is a non-limiting term and is not intended to refer to any single embodiment of the particular invention but encompasses all possible embodiments as described in the application.

The terms "about" and "approximately," when referring to a numerical value or range is intended to encompass the values resulting from experimental error that can occur when taking measurements. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or subranges encompassed within that range as if each numerical value and sub-range is explicitly recited. For example, a weight range of about 1 weight percentage (wt %) to about 20 weight percentage (wt %) should be interpreted to include not only the explicitly recited concentration limits of 1 wt % to approximately 20 wt %, but also to include individual concentrations such as 2 wt %, 3 wt %, 4 wt %, and sub-ranges such as 5 wt % to 15 wt %, 10 wt % to 20 wt %, etc.

Now with references to the Figures, a surface covering 1 according to the invention is shown and is a layered construction having an acoustical section capable of damping, absorbing, and dissipating sound waves.

More particularly, in an exemplary embodiment and shown in FIG. 1, the surface covering 1 is an panel having three main sections: an upper section 10, an acoustical section 20, and an adhesive section 30.

The surface covering 1 according to the invention is laminated from several polymeric components, including vinyl, forming several layers. The total thickness of each surface covering 1, in the embodiments shown is about 4 to about 9.1 mm. The surface covering 1 as shown includes varying layers of materials having differing thickness. The composition of the surface covering 1 may vary as well, with the surface covering 1 being prepared from various materials, including but not limited to polymers, ceramics, metals, organic materials, etc. Furthermore, certain embodiments may include co-polymers, plasticizers, stabilizer co-stabilizers, heater stabilizer, light stabilizers, fillers, pigments, processing aids or combinations thereof. The amounts of the composition components are expressed as parts per hundred on the weight of the polymer ("phr").

In an exemplary embodiment of the invention, the upper section 10 includes a coat layer 12, a wear layer 14, a print layer 16, and a backing layer 18.

According to this layering, the upper section 10 provides various surface properties to the surface covering including, but not limited to, clarity, stain resistance, scratch resistance, abrasion resistance, slip resistance, rigidity, indentation resistance, and tear and gouge resistance. Additionally, the upper section 10 provides aesthetics to the surface covering 1 including color, gloss, sheen, as well as ornamental features. For instance, the upper section 10 may be constructed to imitate the appearance of wood, stone, slate, brick, and other known textures.

In an exemplary embodiment, the coat layer 12 is a wear resistant radiation cured topcoat and, more particularly, an ultra-violet (UV) curing urethane acrylates system. In a preferred embodiment, the coat layer 12 is a two-coat, matte finish system having a sealer coat (such as Akzo Nobel 971-FJS-388) and a topcoat (such as as Akzo Nobel 973-FJS-588). The curing energy to solidify the liquids of the sealer coat and the topcoat is approximately 550 mille joule/cm² and 1000 mille joule/cm², respectively. In an exemplary embodiment of the invention, the thickness of the coat layer 12 is about 1 mm (about 0.04 inch). The coat layer 12 improves the surface properties of the surface covering 1, such as clarity, gloss retention, resistance to stains, scratches, abrasions, and traffic wear, among others.

In an exemplary embodiment, the wear layer 14 is clear and positioned beneath the coat layer 12. The wear layer 14 can either be a transparent polyvinyl chloride (PVC) composition without a phthalate plasticizer component or a non-PVC polymer, such as a polyurethane, ethylene vinyl acetate, olefin polymers, polyester glycol, polylactic acid, and others with similar properties known to those of ordinary skill in the art. Since the wear layer is transparent or clear, any aesthetic print on the ornamental layer would be visible through the wear layer. Although the thickness may vary, the wear layer 14 would range from about 0.1 to about 1.0 mm. Quite often, the thickness of the wear layer and the overall thickness of the product are dictated by customers; the thickness of the wear layer 14 has a significant impact on the overall floor panel construction and various formulas of backing layer 18 are used. For instance, if the surface covering 1 is being used for a commercial application, the wear layer 14 may have a thickness about ≥0.5 mm. The wear layer 14 protects the aesthetical appearance of the underlying print layer from foot traffic and other disrupting forces.

In an embodiment of the invention, the composition of wear layer 14 includes a polyvinyl chloride and a plasticizer. The plasticizer is preferred to be non-phthalate-type plasticizers such as dioctyl terephthalate (DOTP), 1,2-cyclohexane dicarboxylic acid diisononyl ester (DINCH), Diethylene glycol dibenzoate (DE), Dipropylene glycol dibenzoate (DPGDB), and a bio-based plasticizer (i.e., Octadecanoic acid, 10-chloro-9-methoxy-.methyl ester, etc.). However, one skilled in the art should appreciate that other plasticizers can be used. The wear layer 14 may also include a stabilizer that is preferred to be a non-heavy metal content type stabilizer. For instance, a calcium/stearate and/or zinc stearate or calcium/zinc combined complex soap system may be used. Furthermore, the wear layer 14 may further include a co-stabilizer. For instance, an epoxidized soybean oil may be used. A UV light stabilizer may also be added to the wear layer 14, which includes a UV light absorber and hinder amine to maximize the efficiency of UV light stability. The wear layer 14 may use a processing aid as well.

Example I

Table 1 discloses an exemplary embodiment of a wear layer 14 of the surface covering 1 according to the invention.

TABLE 1

| Ingredients | Formula (phr) |
| --- | --- |
| PVC | 100 |
| Plasticizer | 20-30 |
| Heat Stabilizer | 2.0-5.0 |
| Co-stabilizer | 1.0-5.0 |
| UV Light Stabilizer | 0.1-0.5 |
| Processing Aid | 0.5-1.0 |

In an exemplary embodiment, the print layer 16 is positioned beneath the wear layer 14. In an embodiment of the invention, the print layer 16 includes an ornamental element that details the appearance of a texture. In the embodiment shown, the print layer 16 has a printed pattern on a top surface thereof. The printed pattern provides graphics and texture relief, and can be prepared to match any print or even mimic genuine metamorphic rock features. For instance, the printed pattern may mimic wood, stone, slat, paver, brick, sisal, and other surfaces or textures. In the embodiment shown, the ornamental layer is prepared having a thickness around 0.07 mm. However, the thickness of the ornamental layer can be vary. Although the coat and wear layers 12, 14 is positioned on top of the print layer 16, the coat and wear layers 12, 14 are transparent allowing any printed pattern on the top surface of the print layer 16 to be easily seen.

The print layer 16 can be manufactured from a polyvinyl chloride (PVC) composition or a non-PVC polymer, such as a polyurethane, ethylene vinyl acetate, olefin polymers, polyester glycol, polylactic acid, and others with similar properties known to those of ordinary skill in the art.

The print layer 16 can be printed by rotogravure printing, flexo printing, digital printing or transfer printing.

In an embodiment of the invention, the composition of print layer 16 includes polyvinyl chloride and a plasticizer. In an embodiment of the invention, the polyvinyl chloride has a K value in range of 60 to 70. The plasticizer is preferred to be non-phthalate-type plasticizers such as DOTP, DINCH, and a bio-based plasticizer (i.e., Octadecanoic acid, 10-chloro-9-methoxy-.methyl ester, etc.). A stabilizer may be added to the print layer 16 composition. Using a non-heavy metal content type stabilizer is preferred, such as calcium/stearate and/or zinc stearate or calcium/zinc combined complex soap system. The print layer 16 may also include a co-stabilizer. For instance, an epoxidized soybean oil may be used. A titanium dioxide may also be added to the print layer 16 in order to increase opacity.

Table 2 demonstrates an exemplary composition of the print layer 16 according to the invention.

TABLE 2

| Ingredients | Formula (phr) |
|---|---|
| PVC | 100 |
| Plasticizer | 0.0-15.0 |
| Heat Stabilizer | 1.0-3.0 |
| Co-stabilizer | 1.0-5.0 |
| Titanium Dioxide | 1.0-10.0 |

In furtherance, the upper section 10 may include textured features provided on the upper most layers to enhance the feel of the surface covering 1. Therefore, if the upper section 10 is prepared with a printed pattern and a textured surface, the surface covering 1 will have a presentation and feel of a genuine wood, laminate, ceramic, or metamorphic rock surface covering. For instance, the wear layer 14 may include an embossed surface texture that corresponds with a printed pattern on the print layer 16 to enhance the realism of the design. This is called "embossed in register" in the industry and known.

According the invention, the upper section 10 further includes a backing layer 18. The backing layer 18 provides the surface covering 1 with rigidity and other mechanical properties such as indentation resistance, tear and gouge resistance, and dimensional stability.

In an embodiment of the invention, the backing layer 18 may include a homogenous blend of polyvinyl chloride (having high density) and material additives, such that the surface covering can meet preferred material properties, including improved rigidity, strength, thermal conductivity, resiliency, and noise reduction properties. The thickness of the backing layer 18 may vary. Although the backing layer 18 thicknesses may vary, it is appropriate to provide the backing layer 18 having a thickness ranging from about 0.3 to about 2.5 mm. The backing layer 18 could be prepared from a variety of materials, including but not limited to polyvinyl chloride, polyolefin, thermoplastic polyurethane (TPU), or ethylene vinyl acetate (EVA). The composition would depend on the intended application of the surface covering 1.

The backing layer 18 includes a higher amount of filler by parts per 100 parts of polyvinyl chloride than in known applications. As a result, the backing layer 18 will have less polyvinyl chloride and plasticizer content to increase the rigidity and the hardness of the surface covering 1. Because of the high filler content and less content of PVC and plasticizer, the thickness of the layer has a significant impact on the cost of the overall product.

In an exemplary embodiment, the backing layer 18 includes polyvinyl chloride, a plasticizer, a heat stabilizer, a co-heat stabilizer, a filler, and a pigment. The plasticizer is preferred to be non-phthalate-type plasticizers such as DOTP, DINCH, and a bio-based plasticizer (i.e., Octadecanoic acid, 10-chloro-9-methoxy-.methyl ester, etc.). The backing layer 18 may also include a stabilizer, such as a non-heavy metal content type stabilizer. For instance, the non-heavy metal content type stabilizer may be calcium/stearate and/or zinc stearate or calcium/zinc combined complex soap system. The backing layer 18 may also include a co-heat stabilizer, such as an epoxidized soybean oil. A filler may also be added in the backing layer 18. For instance, limestone may be used as a filler. A flame retardant, such as magnesium hydroxide, aluminum trihydrate may be used. A pigment may also be added, such as carbon black or titanium dioxide.

Table 3 demonstrates an exemplary composition of the backing layer 18 according to the invention.

TABLE 3

| Ingredients | Formula (phr) |
|---|---|
| PVC | 100 |
| Plasticizer | 30-50 |
| Heat Stabilizer | 2.0-5.0 |
| Co-Heat Stabilizer | 5.0-10.0 |
| Filler | 200-300 |
| Pigment | 0.5-1.0 |

In another exemplary embodiment of the invention, the upper section 10 includes a backing layer 18 having an upper backing layer 18a and a lower backing layer 18b. In such a construction, the upper section 10 includes a 1 mm coat layer 12, a 0.5 mm wear layer 14, a 0.07 mm print layer 16 film, a 0.7 mm upper backing layer 18a, and a 1.3 mm lower backing layer 18b.

Table 4 demonstrates an exemplary first polymer composition of an upper backing layer 18a according to the invention.

TABLE 4

| Ingredients | Formula (phr) |
|---|---|
| PVC | 100 |
| Plasticizer | 20-40 |
| Heat Stabilizer | 2.0-5.0 |
| Co-Heat Stabilizer | 5.0-10.0 |
| Filler | 200-400 |
| Pigment | 0.5-1.0 |

Table 5 demonstrates an exemplary second polymer composition of a lower backing layer 18b according to the invention.

TABLE 5

| Ingredients | Formula (phr) |
|---|---|
| PVC | 100 |
| Plasticizer | 30-40 |
| Heat Stabilizer | 2.0-5.0 |
| Co-Heat Stabilizer | 5.0-10.0 |
| Filler | 100-200 |
| Pigment | 0.5-1.0 |

According to the invention, the surface covering 1 includes an acoustical section 20. The acoustical section 20 functions to absorb, dampen, and dissipate mechanical energy from forces that produce noises. The acoustical section 20 according to the invention includes one or more materials that can convert sound waves from rapid mechanical energy into a slower viscoelastic response, thus deadening the sound or lowering its frequency. As shown, the acoustical section 20 is secured to the upper section 10 and, more specifically, to the backing layer 18.

In an exemplary embodiment, the acoustical section 20 generally includes an adhesive layer 22 and an acoustical layer 24. In an exemplary embodiment, the acoustical section 20 includes an adhesive layer 22 such as a glue and, more specifically, a hot melt such as a reactive moisture cured polyurethane glue or a hot melt ethylene vinyl acetate glue. The adhesive layer 22 secures the acoustical layer 24 to the upper section 10 and, more specifically, the backing layer 18

In an exemplary embodiment of the invention, the acoustical layer 24 is a low density, highly efficient layer of material made from a renewable, sustainable source, such as cork (typically the porous outer bark of *Quercus suber*), or a synthetic polymeric foam layer.

Cork underlayment is an ideal material for the acoustical backing material because of its unique multi-faced, closed cell honeycomb structure. The cell walls of the honeycomb structure are strong, tough, and tenacious; cells are filled with air and impermeable to liquids and gases. Because of its cell structure, the density of the cork is very low. When the cork is compressed, the cell membranes will change shape, but not break, and the cell is resilient and will return to its original shape after the compression is removed. The many tiny, sealed pockets of air in the cork honeycomb cell structure strongly resist the transmission of sound from vibrations caused by the impact of falling objects, walking, running, dragging furniture, or rolling objects on or across a floor. In addition to the desirable acoustical properties that cork provides to the product, cork has very low thermal conductivit and has desirable chemical resistance, water impermeability, hypoallergenic properties, and fire retardancy.

In another embodiment, the acoustical layer 24 may alternatively be a synthetic polymeric foam material of polyurethane (PUR), polyvinyl chloride (PVC), ethylene vinyl acetate (EVA), polyethylene (PE), EVA/silicone, urea formaldehyde (UF), polystyrene (PS), and irradiant-crosslinked polyethylene (IXPE), or other polymeric foam with similar properties.

The acoustical section 20 according to the invention is light weight and of a thinner gauge than that of any known applications. For instance, the acoustical layer 24 has a thickness of 5 mm or less that accounts for 30%-50% of the total laminated product thickness of the surface covering 1. The preferred density of the acoustical layer 24, according to this invention, is in the range of about 5 lb/ft$^3$ (0.08 g/cc) to about 20 lb/ft$^3$ (0.32 g/cc) and the thickness of the acoustical layer 24 is in the range of about 1 mm (0.04 inch) to about 2 mm (0.08 inch).

The acoustical layer 24 is attached to the backing layer 18 of the upper section 10 using the adhesive layer 22. However, one skilled in the art should appreciate that the acoustical layer 24 can be secured to the upper section 10 using other known means. While in an embodiment, the acoustical layer 24 may be secured to the backing layer 18 using a hot melt, at a typical application rate of about 60 to about 70 gram/m$^2$, the adhesive layer 22 may not be necessary if the acoustical layer 24 can be secured to the upper section 10 using other known means.

According to the invention, the surface covering 1 includes an adhesive section 30.

In an exemplary embodiment, the upper section 10 and the acoustical section 20 is secured to a subfloor of bare wood, concrete, or an underlayment using the adhesive section 30. In an embodiment of the invention, the adhesive section 30 may include an installation elastic glue. The subfloor or underlayment can be porous or non-porous. In a preferred embodiment preferred installation adhesive is a general purpose, hard set adhesive such as a water-based acrylic system, a moisture-cured polyurethane adhesive, a two-part reactive polyurethane adhesive, or a two-part reactive epoxy adhesive. The preferred application rate of the adhesive is in the range of 95-115 square feet per gallon.

Now, an exemplary procedure for manufacturing the surface covering 1 will be described.

According to the invention, the surface covering 1 may be prepared using a hot press lamination process.

Each layer is placed together in the sequence of the wear layer 14, the print layer 16, and the backing layer 18, with an embossing plate placed on top of the above assembled stack. The stack is then heated to approximately 130° C.-150° C. and approximately 3-5 MPa of pressure is applied through the embossing plate for about 20-30 minutes. The press is then cooled to 30° C.-50° C. and the laminated section of floor panel is removed and acclimated in the ambient condition for 4 hours.

In an alternative embodiment, the upper section 10 may be manufactured using a continuous lamination process. In an exemplary embodiment, for the surface covering according to the invention, the continuous lamination process uses stations for adding various layers. For instance, 7 lamination stations may be used to manufacturer a product construction that can be up to 7 layers of material.

In an exemplary embodiment of the invention, the preferred thickness of each layer of the upper section 20 is equal to or less than about 1.3 mm.

Continuously, the print layer 16 is unwound and led to a top surface of the backing layer 18 that is first heated. The print layer 16 and the backing layer 18 are fed into a pair of pressure rolls that firmly press these two layers together.

At the same time, a sheet of the wear layer 14 is unwound and positioned about ⅔ of the circumference of a heat drum to heat up the surface temperature of the first layer around 115° C. and goes under a IR station to further heat up the surface temperature of the first layer to 130-150° C.

Next, at a next lamination station, the wear layer 14 is positioned with the first laminated substrate of the print film 14 and the backing layer 18. The heating process of the second lamination process is very similar to the first lamination process of the print layer 16 and the backing layer 18.

More particularly, the wear layer 14, the print layer 16, and the backing layer 18 are positioned under a IR heating station to heat up the surface to 130-150° C. before the layers are laminated under a pair of pressure rollers. The wear layer 14 is led to a top surface of the heated substrate (print layer 16 and backing layer 18) and then goes through the pressure rollers to firmly bond the wear layer 14 to the first laminated substrate of the print layer 16 and backing layer 18.

In a further process, the coat layer 12 may be applied. More particularly, after the other layers of the upper section 10 are laminated and then cooled down for few hours, an ultra-violet (UV) curable surface coating is applied on top side surface of surface covering 1.

In an exemplary embodiment of the invention, the ultra-violet (UV) curable surface coat layer 12 is a two-coat system applied to a surface covering 1, using a first coating that has a composition distinctive of the second coating. The first coating of the coat layer 12 is applied and cured at lower energy to form a B-stage of the curing process. Then a second high performance coating is applied on top of the $1^{st}$ coating system, and then cured with sufficient energy to fully cure both coatings combined.

An exemplary application of a two-coat system for the coat layer 12 is as follows:

(1) Temperature for the first coating of the ultra-violet (UV) curable surface coating is maintained at 30°-40° C.;

(2) The $1^{st}$ coating is then pumped to the reservoir at the center of a roll coater;

(3) The gap between two roll coater metering rate is set to apply 9-10 grams/square meter of the coating weight, which amounts of coating is equivalent to 12 mµ-13 mµ.

(4) The surface covering 1 is placed on a conveyor and sent through a first coater so that the op surface of the surface covering 1 comes to contact with an applicator roll that applies the first coating onto the top surface of the surface covering 1.

(5) The conveyor the carries the surface covering 1 (with the first coating applied thereto) into a first ultra-violet (UV) curing chamber. The first ultra-violet (UV) curing chamber includes four banks of ultra-violet (UV) lamps, with each lamp capable of emitting up to 250 watts/cm light intensity.

(6) The light intensity is set to the medium to the lower level, so the UV curing energy is set at 300 millijoules/cm2 as needed for the B-stage curing.

(7) After the first coating is semi-cured, the surface covering 1 is carried by the conveyor belt to the second coater and the second coating is applied thereto.

(8) The second coating weight is 9-18 grams/square meter based on the performance requirement.

(9) The conveyor then carries the surface covering 1 (with the $2^{nd}$ coating applied thereto) into a second ultra-violet (UV) curing chamber. The second ultra-violet (UV) curing chamber includes four banks of ultra-violet (UV) lamps, with each lamp capable of emitting up to 250 watts/cm light intensity. The light intensity is set higher than the first ultra-violet (UV) curing chamber, so the UV curing energy is set at about 700 millijoules and above. The total curing energy combined of first and second curing is around 1000 millijoules.

This upper section 10 is now complete and then cut into each individual sheets and proceed through an 80° C. warm bath and then a 40° C. cold bath for annealing. After annealing, the laminated sheet is stacked on a pallet for four hours acclimation in the ambient condition.

Next, an adhesive is used to bond the upper section 10 to the acoustical layer 24 such as IXPE foam or cork sheet. In an exemplary embodiment, an adhesive layer 22 of a hot melt, such as a reactive moisture cured polyurethane adhesive system, is used to bond the backing layer 18 with the acoustical layer 24. The application rate is 60-70 grams per square meter.

Then, the adhesive section 30 is applied to a bottom surface of the acoustical layer 24 to secure the surface covering 1 to a support surface, such as a concrete floor.

In an exemplary embodiment, the surface covering 1 is constructed together in the following sequence:

(1) a radiation-cured coat layer 12;
(2) a wear layer 14;
(3) a print layer 16;
(4) a backing layer 18;
(5) an adhesive layer 22;
(6) an acoustical layer 24; and
(7) an adhesive section 30.

When assembled, the surface covering 1 is capable of exceeding a rating of 50 for both the IIC (ASTM E492) and STC (ASTM E90) sound transmission tests (ASTM International, www/astm.org). The performance rating of 50 is the minimum for compliance with the International Building Code (IBC), a model building code developed by the International Code Council (ICC) and adopted for use as a base code standard by most jurisdictions in the United States.

ASTM E492 impact isolation test (IIC) is designed to measure the impact transmission performance of an isolated floor/ceiling assembly in a controlled laboratory environment. Similarly, ASTM E90 (STC) evaluates the performance of airborne transmission loss of an isolated partition element in a controlled environment. Both tests involve a standardized noise making apparatus in an upper chamber and a sound measuring system in a lower chamber. Decibel measurements are taken at various specified frequencies in the lower chamber. Those readings are then converted into a whole number using a mathematical formula that represents the performance rating. The higher the number, the higher the resistance of sound transmission properties or reduction airborne sound is.

Another ASTM E2179 test known as the "Delta" test is used to measure the IIC performance difference between the flooring materials over a concrete sub-floor and a bare concrete subfloor. The "Delta" IIC value is obtained by subtracting the measured IIC number by 28, the value for the reference bare concrete floor from the standard.

Noise generation is typically produced by impact between two rigid materials causing structure within the material having rapid short-range bending and stretching of interatomic bonds and rapid elastic response, thus producing high-frequency sound waves in the adjacent air or transmitting through the floor ceiling assembly. The solution of this phenomena is to replace one of these hard surface material with a softer type of polymeric material that can convert some of the rapid mechanical energy into a slower viscoelastic response, thus deadening the sound or lowering its frequency. Therefore, the solution of the noise problem is to develop a product with a desirable acoustical layer capable of damping, absorbing and dissipating the mechanical energy of impact into heat. With this understanding, the invention here is to develop an acoustical flooring based on the construction of the upper rigid section comprising all elements required by end users needs such as surface properties of clarity, stain, abrasive, scratch and slip resistance properties as well as the decorative effect in design, color, and sheen, etc. The middle section is the softer layer that has outstanding properties in absorbing, damping and dissipating mechanical energy from the outside motions. Lastly, the combined product of the upper and middle section is firmly attached to the subfloor of a bare wood or concrete with an elastic glue system.

A surface covering 1 having a backing layer 18 whose composition was identified in Table 4 was acoustical tested based on ASTM E492 measuring impact isolation class (IIC), ASTM E90 for sound transmission class (STC), and the E2179 for Delta IIC value. The resulting acoustical properties are as follows in Table 6.

TABLE 6

| Test Standard ID | Measure | Value |
|---|---|---|
| ASTM E492 | Impact Isolation (IIC) | 53 |
| ASTM E90 | Sound Transmission (STC) | 54 |
| ASTM E2179 | Δ Impact Isolation (IIC) | 24 |

A surface covering 1 having a backing layer 18 whose composition was identified in Table 5 (i.e., an upper backing layer 18a and a lower backing layer 18b) was also acoustical tested based on ASTM E492 measuring impact isolation class (IIC), ASTM E90 for sound transmission class (STC), and the E2179 for Delta IIC value. The resulting acoustical properties are as follows in Table 7.

TABLE 7

| Test Standard ID | Measure | Value |
|---|---|---|
| ASTM E492 | Impact Isolation (IIC) | 54 |
| ASTM E90 | Sound Transmission (STC) | 54 |
| ASTM E2179 | Δ Impact Isolation (IIC) | 24 |

The foregoing illustrates some of the possibilities for practicing the invention. Many other embodiments and applications of a surface covering according to the invention are possible and within the scope and spirit of the invention. It is, therefore, intended that the foregoing description be regarded as illustrative rather than limiting, and that the scope of the invention is given by the appended claims together with their full range of equivalents.

What is claimed is:

1. A surface covering, comprising
   an upper section of laminated polymeric layers having;
   a radiation-cured coat layer with a two-coat, matte finish, ultra-violet curing urethane acrylates system having a sealer coat and a top coat;
   a wear layer which is clear and positioned beneath the coat layer, the wear layer having a composition composed of 100 part per hundred of rubber (phr) of a polyvinyl chloride, 20-30 phr of a plasticizer, 2.0-5.0 phr of heat stabilizer, 1.0-5.0 phr of a co-stabilizer, 0.1-0.5 phr of a ultra-violet (UV) light stabilizer and 0.5-1.0 phr of a processing aid;
   a print layer which is positioned beneath the wear layer and includes an ornamental element that details the appearance of a texture, the print layer having a composition composed of 100 part per hundred of rubber (phr) of a polyvinyl chloride, 0.0-15.0 phr of a plasticizer, 1.0-3.0 phr of a heat stabilizer, 1.0-5.0 phr of a co-stabilizer and 1.0-10.0 phr of a titanium dioxide;
   a rigid backing layer having a composition composed of 100 part per hundred of rubber (phr) of a polyvinyl chloride, 30-50 phr of a plasticizer, 2.0-5.0 phr of a heat stabilizer, 5.0-10.0 phr of a co-heat stabilizer, 200-300 phr of a filler and 0.5-1.0 of a pigment;
   an acoustical section for dissipating sound waves, the acoustical section having a single low density layer of material that provides about 30% to about 50% of the total thickness of the surface covering, the low density layer of material consisting essentially of cork material and an adhesive layer securing the acoustical layer to the rigid backing layer; and
   an adhesive section securing the upper section and the acoustical section to a support surface wherein the adhesive section having an installation elastic glue, wherein the application rate of the adhesive is in the range of 95-115 square feet per gallon and the acoustical section has a density of about 5 lb/ft$^3$ (0.08 g/cc) to about 20 lb/ft$^3$ (0.32 g/cc).

2. The surface covering of claim 1, wherein the total thickness thereof is about 4 to about 9.1 mm.

3. The surface covering of claim 1, wherein the upper section includes the wear layer, the backing layer, and the print layer positioned between the wear layer and the backing layer.

4. The surface covering of claim 3, wherein the backing layer is secured to the acoustical section positioned on a bottom surface of the acoustical section.

5. The surface covering of claim 4, wherein the wear layer has a thickness from about 0.1 to about 1.0 mm.

6. The surface covering of claim 4, wherein the plasticizer of the wear layer can be a non-phthalate plasticizer.

7. The surface covering of claim 6, wherein the non-phthalate plasticizer is selected from a group consisting of dioctyl terephthalate (DOTP), 1,2-cyclohexane dicarboxylic acid diisononyl ester (DINCH), diethylene glycol dibenzoate (DE), dipropylene glycol dibenzoate (DPGDB) and bio-based plasticizer.

8. The surface covering of claim 6, wherein the backing layer has a thickness ranging from about 0.3 to about 2.5 mm.

9. The surface of claim 8, wherein the backing layer includes the polymer composition selected from a group consisting of polyvinyl chloride, polyolefin, thermoplastic polyurethane (TPU), or ethylene vinyl acetate (EVA).

10. The surface covering of claim 6, wherein the backing layer includes an upper backing layer having a first polymer composition and a filler being about 200 to about 400 parts per 100 parts of the first polymer composition.

11. The surface covering of claim 10, wherein the first polymer composition is selected from a group consisting of polyvinyl chloride, polyolefin, thermoplastic polyurethane (TPU), or ethylene vinyl acetate (EVA).

12. The surface covering of claim 11, wherein the backing layer includes a lower backing layer having a second polymer composition and a filler being about 100 to about 200 parts per 100 parts of the second polymer composition.

13. The surface covering of claim 12, wherein the second polymer composition is selected from a group consisting of polyvinyl chloride, polyolefin, thermoplastic polyurethane (TPU), or ethylene vinyl acetate (EVA).

14. The surface covering of claim 4, wherein the adhesive layer is a reactive moisture cured polyurethane glue.

15. The surface covering of claim 14, wherein the acoustical section has a thickness of about 5 mm or less.

16. The surface covering of claim 15, wherein the coat layer has a thickness of about 1 mm.

17. A surface covering, comprising:
    a laminated panel having:
    an upper section having:

a radiation-cured coat layer with a two-coat, matte finish, ultra-violet curing urethane acrylates system having a sealer coat and a top coat a wear layer which is clear and positioned beneath the coat layer, the wear layer having a composition composed of a polyvinyl chloride, a plasticizer, a heat stabilizer, a co-stabilizer, an ultra-violet light stabilizer and a processing aid;

a print layer which is positioned beneath the wear layer and includes an ornamental element that details the appearance of a texture;

a backing layer which provides the surface covering with rigidity and other mechanical properties such as indentation resistance, tear and gouge resistance, and dimensional stability wherein the backing layer having a composition composed of a polyvinyl chloride, a plasticizer, a heat stabilizer, a co-heat stabilizer, a filler and a pigment wherein the backing layer further includes:

an upper backing layer having a first polymer composition and a filler being about 300 to about 400 parts per 100 parts of the first polymer composition; and a lower backing layer having a second polymer composition and a filler being about 100 to about 200 parts per 100 parts of the second polymer composition; and an acoustical section secured to the backing layer and having a single low density layer of material, the single low density layer of material consisting essentially of cork material wherein the acoustical section has a density of about 5 lb/ft$^3$ (0.08 g/cc) to about 20 lb/ft$^3$ (0.32 g/cc); and an adhesive section securing the upper section and the acoustical section to a support surface having an installation elastic glue.

18. The surface covering of claim 17, wherein the acoustical section has a thickness of about 5 mm or less.

19. The surface covering of claim 18, wherein the acoustical section is about 30% to about 50% of the total thickness of the surface covering.

20. The surface covering of claim 17, wherein the backing layer has a thickness ranging from about 0.3 to about 2.5 mm.

21. The surface covering of claim 20, wherein the backing layer includes the polymer composition selected from a group consisting of polyvinyl chloride, polyolefin, thermoplastic polyurethane (TPU), or ethylene vinyl acetate (EVA).

22. The surface covering of claim 21, wherein the backing layer further includes the filler being about 200 to about 300 parts of polymer composition.

23. The surface covering of claim 22, wherein the first polymer composition is selected from a group consisting of polyvinyl chloride, polyolefin, thermoplastic polyurethane (TPU), or ethylene vinyl acetate (EVA).

24. The surface covering of claim 23, wherein the second polymer composition is selected from a group consisting of polyvinyl chloride, polyolefin, thermoplastic polyurethane (TPU), or ethylene vinyl acetate (EVA).

* * * * *